Jan. 20, 1970  R. E. McKINNEY  3,490,632
PORTABLE BIN ASSEMBLY
Filed Nov. 8, 1967  4 Sheets-Sheet 1
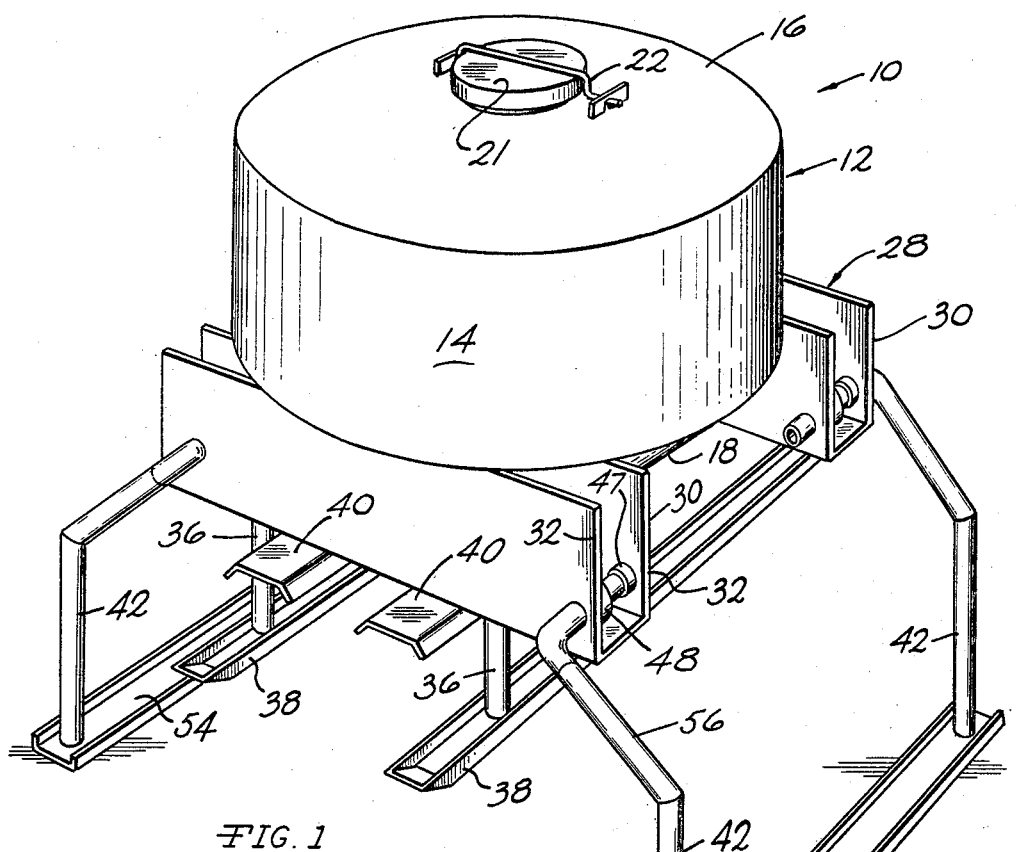
FIG. 1
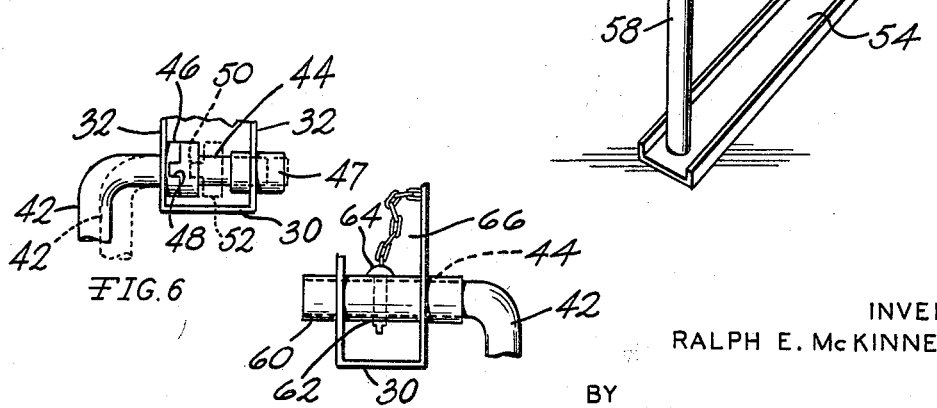
FIG. 6
FIG. 7
INVENTOR
RALPH E. McKINNEY
BY
Olsen and Stephenson
ATTORNEYS Jan. 20, 1970   R. E. McKINNEY   3,490,632
PORTABLE BIN ASSEMBLY
Filed Nov. 8, 1967   4 Sheets-Sheet 2

INVENTOR
RALPH E. McKINNEY
BY
*Olsen and Stephenson*
ATTORNEYS

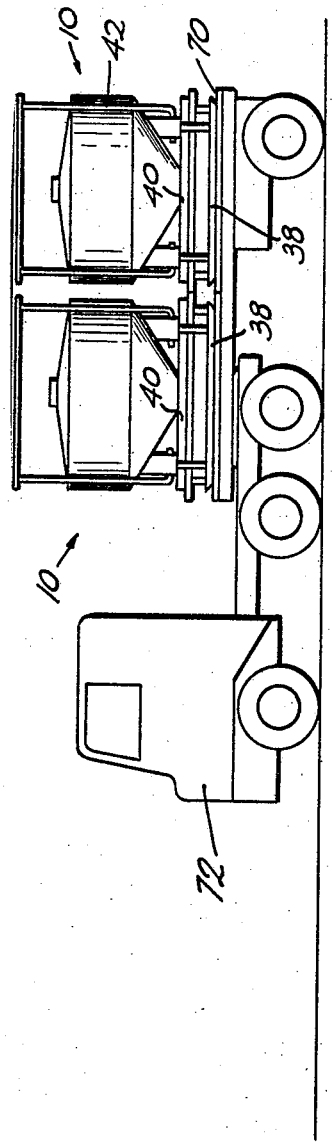
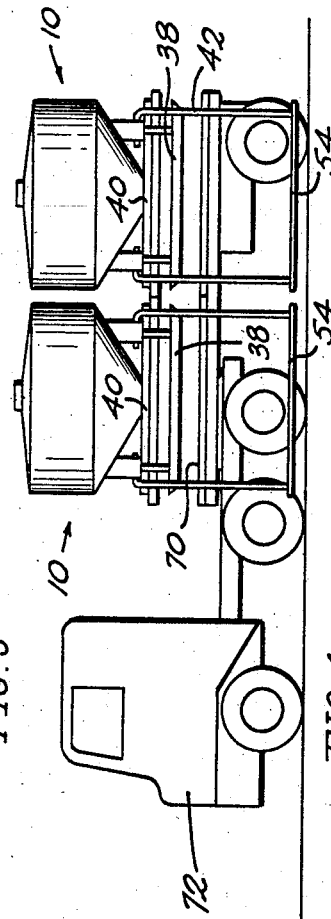
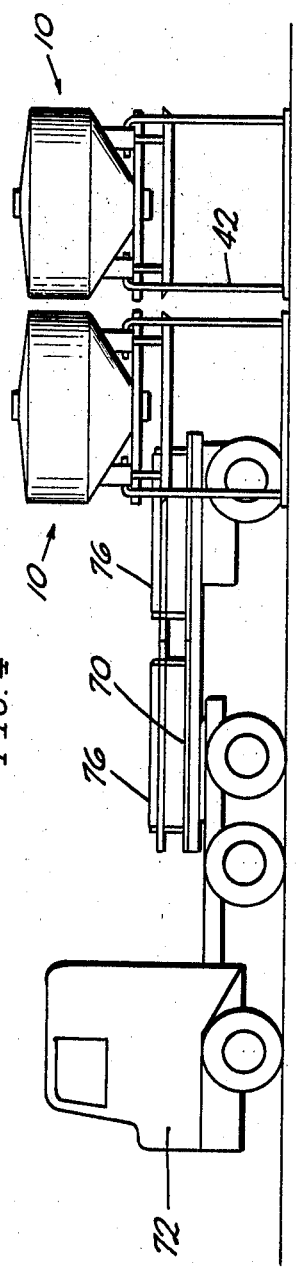
INVENTOR
RALPH E. McKINNEY

Jan. 20, 1970  R. E. McKINNEY  3,490,632
PORTABLE BIN ASSEMBLY

Filed Nov. 8, 1967  4 Sheets-Sheet 4

INVENTOR
RALPH E. McKINNEY

BY
*Olsen and Stephenson*
ATTORNEYS

United States Patent Office 3,490,632
Patented Jan. 20, 1970

---

3,490,632
PORTABLE BIN ASSEMBLY
Ralph E. McKinney, Beatrice, Nebr., assignor to Hoover Ball and Bearing Company, Saline, Mich., a corporation of Michigan
Filed Nov. 8, 1967, Ser. No. 681,531
Int. Cl. B60p 3/00; B65j 1/02
U.S. Cl. 214—512                    1 Claim

ABSTRACT OF THE DISCLOSURE

A bin assembly consisting of an upright hollow container having a hopper bottom which terminates in a discharge opening, a first set of short legs on which the bin is supported during transport on a vehicle, and a second set of longer legs usable to ground support the bin assembly in a position in which a vehicle load supporting bed can be driven under the shorter set of legs. The ground support legs are movable to out-of-the-way positions when the bin is supported on the shorter set of legs. Bin assemblies are disclosed in which the ground support legs are both pivotally mounted for movement to upright folded positions and are removably mounted for detachment during transport.

CROSS REFERENCE TO RELATED APPLICATIONS

The bin assembly of this invention forms a part of a material distribution system disclosed in copending application, Ser. No. 681,532, filed Nov. 8, 1967 and is particularly adapted for use with a fertilizer applicator vehicle disclosed in copending application Ser. No. 688,463 filed Dec. 6, 1967. Both applications are assigned to the assignee of this application.

BACKGROUND OF THE INVENTION

The bin assembly of this invention has general utility in bulk material handling systems in which a portable bulk storage unit, a discharge hopper, and/or a shipping container is desired. A fertilizer distribution system is an example of a bulk material handling system in which the bin assembly is particularly useful. At present, geographically centralized farm centers obtain the basic fertilizer ingredients in rail covered hopper cars and store them in large storage areas. Based on soil samples from a field to be fertilized, the basic fertilizer ingredients are taken from the storage areas in the desired proportions and then blended for subsequent distribution on the field. When the field is to be fertilized, this blend is loaded into a trailer spreader which is then towed to the field. In the event the field is of a size to require more fertilizer than the capacity of the spreader, which is the usual case, the spreader must either be returned several times for filling, or a large volume of the fertilizer must be trucked to the field and periodically transferred to the spreader. This system is very time consuming and requires a considerable amount of expensive equipment which is required to sit idle during substantial time periods in the overall process.

SUMMARY OF THE INVENTION

This invention provides a bottom discharge bin assembly which functions as a combination portable bulk storage unit, a bulk material discharge hopper, and a bulk material shipping container which is usable in any blending or discharge system for both granulated and liquid materials. The bin assembly has two sets of legs, one short set functioning to support the bin during over-the-road and over-the-field transport of the bin, and the other set being longer to enable loading and unloading of the bin relative to vehicles and being either foldable or removable during transport of the bin. The bin assembly includes a large hollow container shaped to form a bottom discharge hopper that terminates in a downwardly facing discharge opening. The container has a top filling opening to facilitate filling of the container and is of a large size. For example, when the container is used in the above-described fertilizer distribution system, the container is of a size to hold four tons of fertilizer. The longer set of legs are of a length to support the shorter set of legs at a position above the height of the bed on the truck used to transport the bin assembly. Also, the longer legs are spaced apart a distance greater than truck bed width so that the truck bed can be backed into a position between the longer legs, when these legs are ground supported, and below the shorter legs. This enables the bin assembly to be first raised, to disengage the longer legs from the ground and then lowered to a position in which the shorter legs are supported on the truck bed. The longer legs are mounted in one form of the invention so that they can be folded to out-of-the-way positions during transport of the bin assembly. In other forms of the invention, the legs are removably mounted so that they can be detached during transport of the bin assembly.

Further objects, features and advantages of this invention will become apparent from a consideration of the following description, the appended claims, and the accompanying drawing in which:

FIGURE 1 is a perspective view of one form of the bin assembly of this invention;

FIGURE 3 is a side elevational view of a pair of bins, like the bin shown in FIG. 1, illustrating the bins in supported positions on a transport vehicle;

FIGURE 4 is a side elevational view, like FIG. 3, showing the bins in elevated positions immediately prior to unloading of the bins from the vehicle to supported positions on the ground;

FIGURE 5 is a view, like FIGS. 3 and 4, showing the bins in ground supported positions with the transport vehicle being driven away;

FIGURE 6 is a detail view illustrating the structure for locking the bin ground support legs in bin supporting positions;

FIGURE 7 is a detail sectional view, like FIG. 6, showing an alternate form of leg locking structure;

Figure 2:
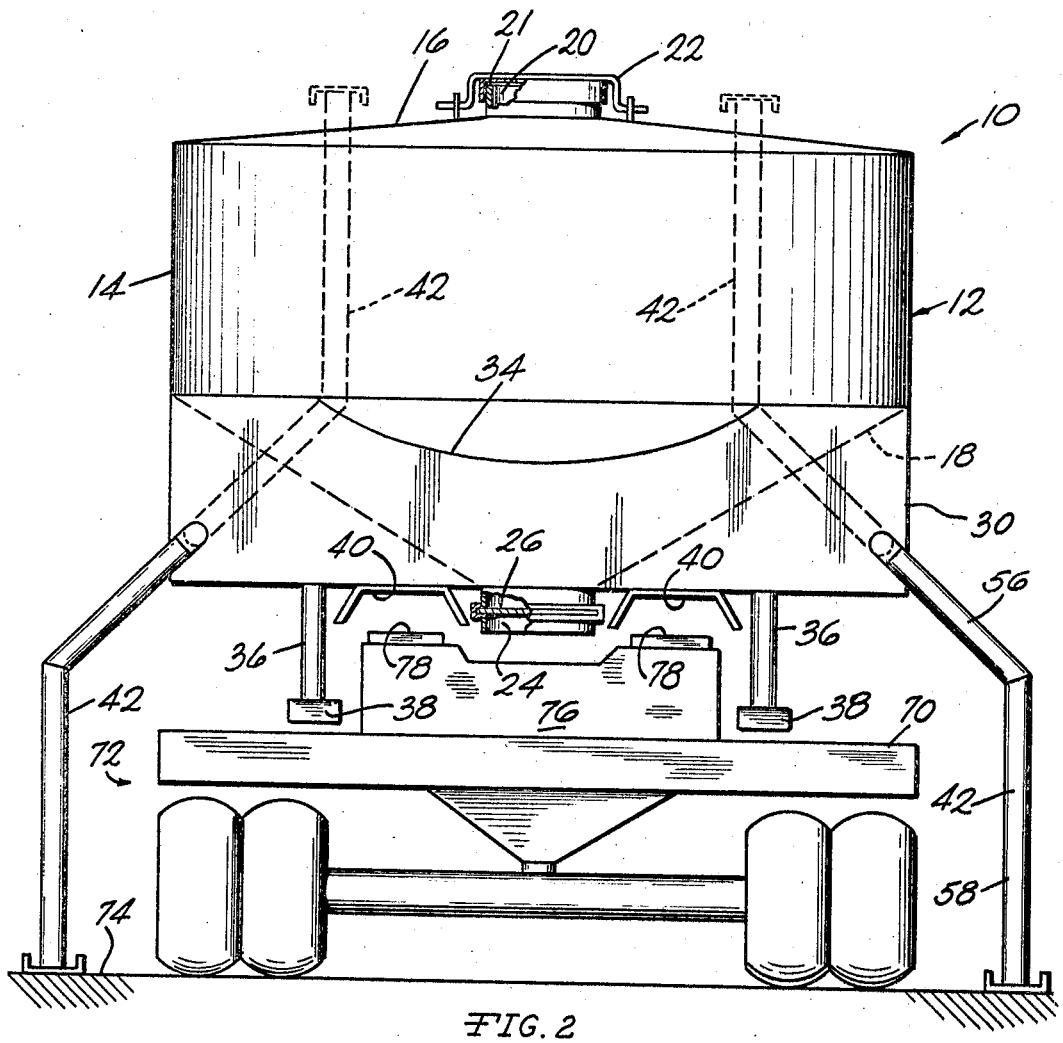
FIGURE 2 is a rear elevational view of the bin assembly shown in FIG. 1, with some parts broken away and other parts shown in section for the purpose of clarity, and illustrating the position of the bin assembly relative to the bed of a transport vehicle onto which the bin is to be moved.

With reference to the drawing, the bin assembly of this invention, indicated generally at 10, is illustrated in FIGS. 1 and 2 as including a hollow container 12 having a tubular upper portion 14 provided with a top wall 16 and a conical or funnel shape hopper portion 18 which extends downwardly from the portion 14. A filling opening 20 in the top wall 16 is provided with a weather-tight cover assembly 21 which is removably held in place by a cover latch unit 22. The hopper portion 18 terminates at its lower end in a discharge opening 24 which is closed by a movable slide gate 26.

The container 12 is supported on a frame 28 consisting of two transversely spaced channel members 30. Each of the channel members 30 includes a pair of upright side wall sections 32 which are cut at their upper edges 34 so as to conform to the shape of the hopper portion 18 and are secured thereto so that the channel sections 30 are located on opposite sides of the container discharge opening 24. Four downwardly extending short legs or support members 36 are secured to the channels 30, and a pair of skid members 38 are mounted on the lower ends of pairs of supports 36 so that the skid members 38 extend transversely of the channels 30. A pair of lift force transmitting plates 40, each of which is of generally inverted U-shape in cross section, are secured to the lower ends of the channels 30 so that they are positioned on opposite sides of the container discharge opening 24 and are generally parallel to and disposed above the skid members 38 for a purpose to appear presently.

Four ground support legs 42, which are considerably longer than the support members 36, are connected to the channels 30 so that the legs 42 are movable between the operative positions shown in solid lines in FIG. 2 and the inoperative folded positions shown in broken lines in FIG. 2. Each leg 42 has a bearing section 44 (FIG. 6) which extends through the side walls 32 in one of the channels 30, as shown in FIG. 6. The bearing section is rotatably supported in tubular bearings 46 and 47 carried by the channel walls 32. As shown in FIG. 6, the bearing 46 is provided on diametrically opposite sides with notches 48, only one of which is shown, shaped to receive a projection or tongue 50 on a sleeve 52 secured to the bearing section 44. As a result, each leg 42 can be shifted in one direction to move the sleeve 52 thereon to a position in which the tongue 50 is disengaged from a notch 48. In this position of the leg 42, the bearing section 44 is rotatable in the bearings 46 and 47 to enable pivotal movement of the leg 42 between its operative and inoperative positions shown in FIG. 2. When the leg 42 is in its operative position, it is readily locked against rotatable movement by shifting the leg 42 and the bearing section 44 so as to engage the tongue 50 in a notch 48.

The legs 42 on each side of the container 12 are connected by channel plates 54 which are parallel to the skid members 38. The bearings 46 and 47 for connected legs 42 are relatively arranged so that the legs 42 can be shifted in the same direction to disengage the tongues 50 therefor from the notches 48 in the bearings 46. Thus, when the legs 42 are in their positions shown in solid lines in FIG. 2, the sleeves 52 are in interlocking engagement with the bearings 46 so as to lock the legs 42 in this position in which each leg has an upper section 56 which is inclined downwardly and outwardly relative to the container 12 and a lower upright section 58. The legs 42 are moved to their inoperative positions by first shifting the legs in one direction so as to move the sleeves 52 out of engagement with the bearing notches 48. The bearing sections 44 for the legs 42 are then rotated in the bearings 46 and 47 so as to move the legs about 180° to their broken line positions shown in FIG. 2 in which the sections 58 of the legs extend upwardly. The legs 42 are then shifted in a reverse direction to re-engage the tongues 50 thereon in bearing notches 48 to lock the legs in their inoperative positions.

A modified form of leg locking structure is shown in FIG. 7. Each leg bearing section 44 is rotatably supported in a bearing sleeve 60 carried by one of the channels 30. An opening 62 extends diametrically through the sleeve 60 and the bearing section 44 and a locking pin 64 is attached to a chain 66 secured to the channel 30. In the operative and inoperative positions of each leg 42, the pin 64 is extended through the opening 62 so as to lock the leg. During movement of the leg 42 between its operative and inoperative positions, the pin 64 is removed.

The bin assembly 10 is particularly adapted for use with the load carrying bed 70 (FIG. 2) on a vehicle such as the truck shown at 72 in FIGS. 3–5. As shown in FIG. 2, when the legs 42 are supported on a ground surface, indicated at 74, the skid members 38 on the lower ends of the supports 36 are located above the height of the bed 70. In addition, the upright leg sections 58 are spaced apart a sufficient distance greater than the width of the bed 70 to enable the bed 70 to be moved horizontally into a position between the legs 42 and below the skid members 38, such as by backing the vehicle 72. This construction of the bin assembly 10 to enable this positioning of the bed 70 is for the purpose of enabling the bin assembly 10 to be moved onto and off of supported positions on the bed 70 in the manner hereinafter described.

The bed 70 is equipped with a lift unit indicated more or less diagrammatically at 76 in FIG. 2 having upwardly movable lift members 78 positioned below and in vertical alignment with the lift force transmitting members 40 on the bin assembly 10 when the bed 70 is located as shown in FIGS. 2, 3 and 4. The lift unit 76 is operable to raise the lift members 78 into engagement with the force transmitting members 40 and apply lifting forces of a magnitude sufficient to raise the bin assembly 10 so that the leg connecting plates 54 are above the ground surface 74, as shown in FIG. 4. The leg members 42 can then be moved to their inoperative positions, shown in broken lines in FIG. 2, following which the lift members 78 can be retracted to lower the bin 10 to a position in which the skid members 38 support the bin assembly 10 on the bed 70. The vehicle 72 can then be moved so as to transport the bin assembly 10 to a desired location.

Figure 8:
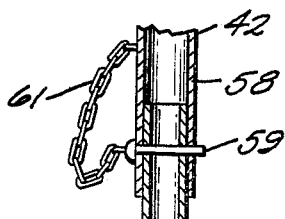
FIGURE 8 is a fragmentary detail sectional view of a telescoping bin leg construction.

In the event the height of the bed 70 relative to the height of the container 12 is such that it is desirable to have the legs 42 shorter when in their transport positions than when in their operative positions, each leg section 58 is provided with a telescoping extension 58a, as shown in FIG. 8. The extension 58a is locked in an extended position by means of a removable pin 59 secured to the leg section 58 by a chain 61.

Assume that the vehicle 72 has had two of the bin assemblies 10 moved to supported positions on the bed 70 and that the vehicle 72 has been moved to a location at which it is desired to unload the bin assemblies 10, as shown in FIG. 3. The lift unit 76 is first operated to raise the bin assemblies 10, as shown in FIG. 4, to a position in which the legs 42 can be swung downwardly from the inoperative positions shown in FIG. 3, to their operative positions shown in FIG. 4 in which the ground engaging plates 54 are spaced slightly above the ground surface. The lift unit is then operated to retract the lift members 78 to lower the leg plates 54 into supported positions on the ground surface and move the lift members 78 into a clearance relation with the bin assembly 10. The vehicle 72 can then be driven forwardly so as to move the bed 70 out from under the bin assemblies 10, as shown in FIG. 5.

Thus, loaded bin assemblies 10 can be moved to a desired point of use, emptied of their contents, and be reloaded onto the vehicle bed 70 by reversing the above-described cycle. In other words, to reload one or more bin assemblies 10 onto the bed 70, the vehicle 72 is first driven so as to back the bed 70 between the bin assembly legs 42 and under the bin skids 38, as shown in FIG. 5. The bins are then lifted to clear the leg plates 54 from the ground, as shown in FIG. 4, the bin legs 42 are moved to inoperative positions, and the lift members 78 are lowered to the lower bin assemblies 10 into supported positions on the bed 70 as shown in FIG. 3.

It can thus be seen that the bin assembly 10 of this invention enables large volumes of bulk material to be readily stored, shipped, and discharged through the container hopper section 18. In the use of the bin assembly 10 for transporting fertilizer, the container 12 can be of a size to hold four tons of fertilizer.

Figure 9:
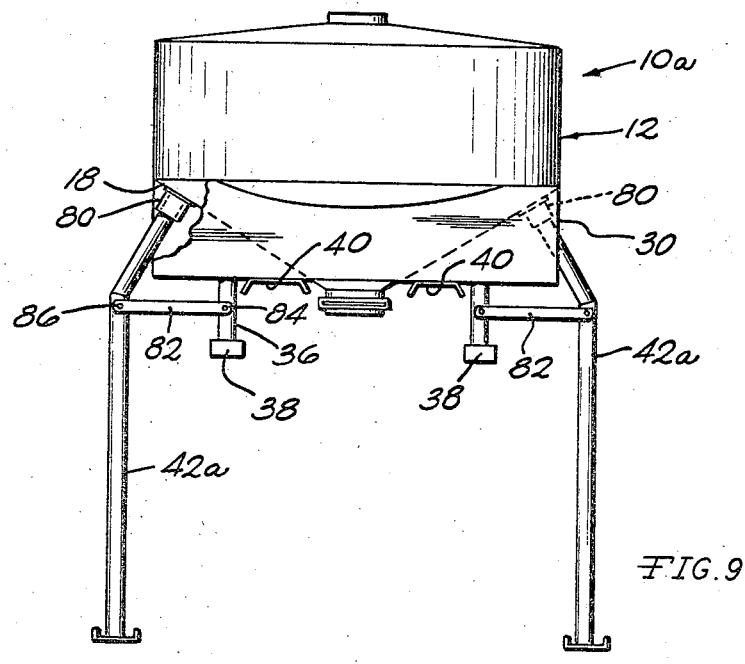
FIGURES 9 and 10 are elevational views of modified forms of the bin assembly of this invention.

A modified form of the bin assembly of this invention, indicated at 10a in FIG. 9, is identical to the bin assembly 10 except that the four legs 42a in the bin assembly 10a are removably mounted at their upper ends in tubular sockets 80 mounted on the container hopper portion 18. Each socket 80 telescopically receives the upper end of a leg 42a which is then braced in this position by removably connecting one end of a brace 82 to a support member 36 by means of a pin 84. The opposite end of the brace 82 is attached by a pin 86 to the leg 42a. When the legs 42 are mounted in the sockets 80 and connected to the support members 84 by the braces 82, as shown in FIG. 9, the legs 42a function exactly like the legs 42 in the bin assembly 10 to ground support the bin assembly 10a in a position in which the bed 70 can be located relative to the skid members 38 as shown in FIG. 2. The legs 42a are moved to out-of-the-way inoperative positions, like the broken line positions shown for the legs 42 in FIG. 2, when the bin is supported as shown in FIG. 4 on the force transmitting members 40, by removing the brace pins 84 and withdrawing the legs 42a from the sockets 80. The legs 42a can then be stored on the vehicle bed 70 until their use is next required. Thus, the bin 10a can be used like the bin assembly 10, as illustrated in FIGS. 3–5.

Figure 10:
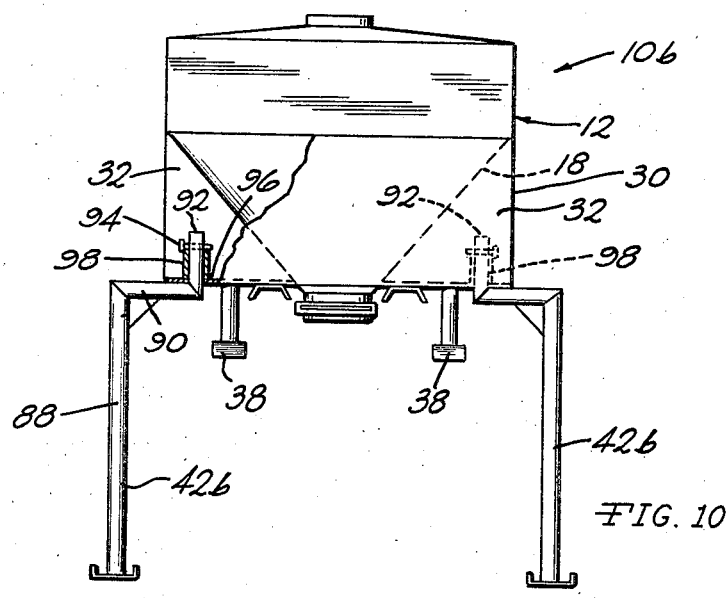

Another modified form of the bin assembly of this invention is illustrated in FIG. 10 and indicated generally at 10b. The bin assembly 10b is also exactly like the bin assembly 10a except for the manner in which the four legs 42b are mounted on the channel frame members 30. Each leg 42b has an upright lower section 88 and a substantially horizontal upper section 90 which terminates in an upwardly extending section 92 formed with an opening in which a locking pin 94 can be inserted. Each of the channel frame members 30 is provided in its lower wall 96 with an upwardly extending tubular socket 98 of a size to receive the leg section 92. As shown in FIG. 10, when a leg 42b is mounted on the container 12, the leg section 92 is extended upwardly through the socket 98 until the leg section 90 engages the channel bottom wall 96. The pin 94 is then inserted in the leg section 92 to prevent accidental withdrawal of the leg 42b from the socket 98. When the legs 42b are mounted in their operative positions, as shown in FIG. 10, they are spaced apart a distance corresponding substantially to the spacing of the leg sections 58 in the bin assembly 10 and the bottom ends of the legs 42b are spaced from the skid members 38 a distance corresponding to the spacing of the lower ends of the legs 42 from the skid members 38 in the bin assembly 10. Consequently, when the container 12 is ground supported on the legs 42b, the bin assembly 10b is usable like the bin assembly 10, as illustrated in FIGS. 3–5. The leg members 42b are moved to inoperative out-of-the-way positions, when the bin assembly 10b is lifted, by withdrawing the pins 94 and removing the leg sections 92 from the sockets 98.

It will be understood that the portable bin assembly which is herein disclosed and described is presented for purposes of explanation and illustration and is not intended to indicate limits of the invention, the scope of which is defined by the following claim.

What is claimed is:

1. A portable bin assembly comprising:
    a hollow container having a downwardly facing discharge opening,
    container support means secured to and extending downwardly from said container,
    leg means mounted on said container for movement between a first container supporting position in which said leg means extends downwardly below said support means so that said container can be supported on said leg means and a second out-of-the-way position in which said container is supportable on said support means,
    frame means secured to said container in a supporting relation therewith, and
    lift force transmitting members secured to said frame means on opposite sides of said discharge opening and disposed above the lower ends of said support members.

References Cited

UNITED STATES PATENTS

| | | | |
|---|---|---|---|
| 2,304,622 | 12/1942 | Barrett | 214—515 |
| 2,596,838 | 5/1952 | Carver et al. | |
| 2,670,866 | 3/1954 | Glesby | 214—515 XR |
| 2,678,738 | 5/1954 | Mangrum | 214—515 XR |
| 3,074,576 | 1/1963 | Peterson | 214—515 |
| 3,180,601 | 4/1965 | Belt | 214—515 XR |
| 3,186,570 | 6/1965 | Bunnell | 214—515 |
| 3,257,019 | 6/1966 | Carroll | 214—515 |
| 3,285,448 | 11/1966 | Palm et al. | 214—512 |

ALBERT J. MAKAY, Primary Examiner

U.S. Cl. X.R.

214—515